Patented Mar. 16, 1943

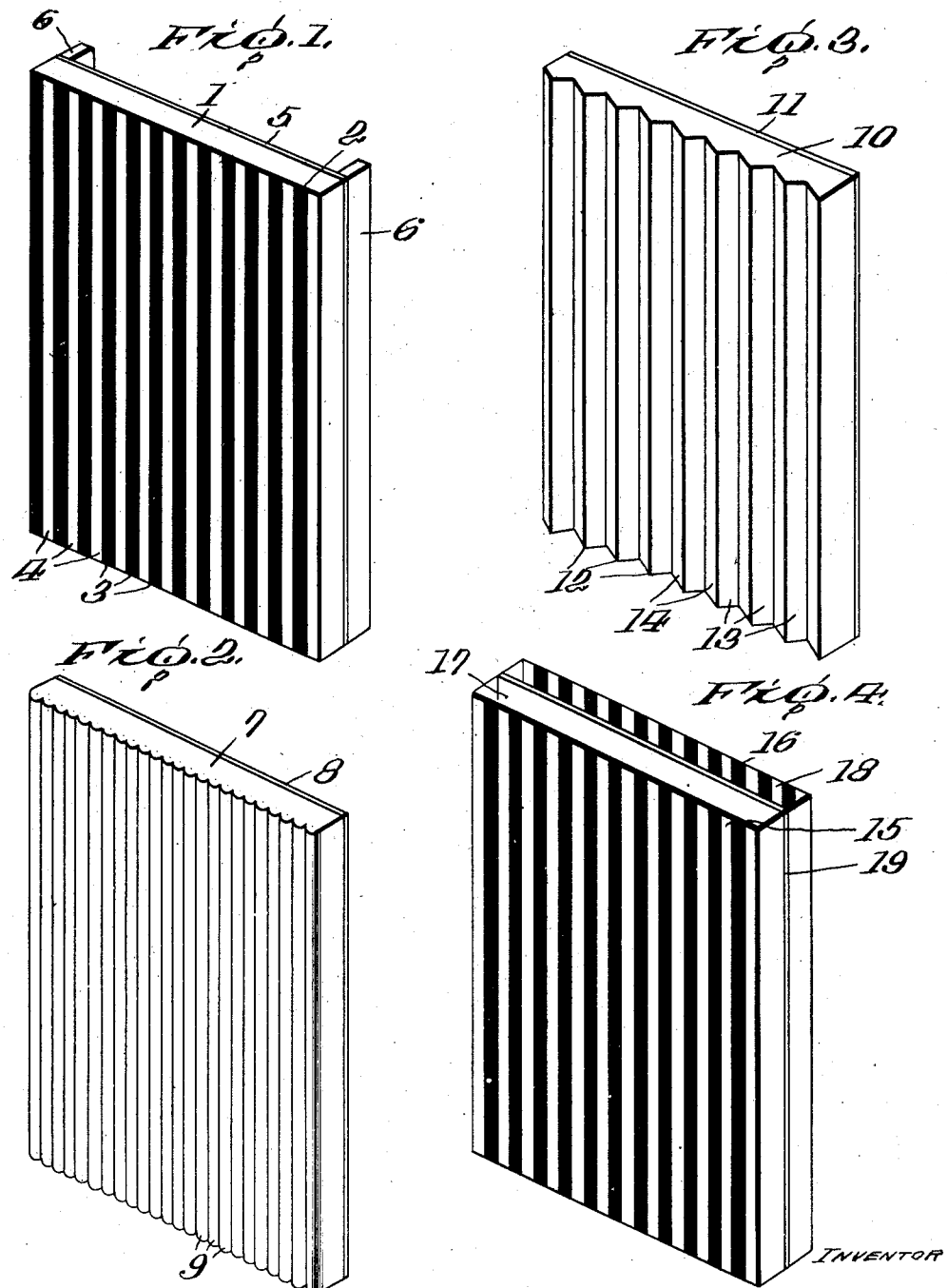

2,313,947

UNITED STATES PATENT OFFICE 2,313,947

SCREEN AND GRATING FOR STEREOSCOPIC PICTURES

Anna J. M. Klinkum, New York, N. Y.

Application August 1, 1940, Serial No. 349,189

2 Claims. (Cl. 88—28.93)

This invention relates to a new and improved screen and grating for stereoscopic effect pictures and is equally applicable for stills and cinematographic pictures.

It is an object of the invention to provide a construction in which the grating is maintained in fixed relation to the screen for rear projection of pictures.

A further object of the invention is to provide a construction which will eliminate the usual frame in which the screen and the grating are mounted.

A still further object of the invention is to provide a construction which will maintain the requisite and necessary spacing between the screen and the grating even during temperature changes which render devices at present used inaccurate.

Another object of the invention is to provide a construction wherein a transparent solid material interconnects the grating surface and the screen surface.

With the above and other objects in view which will become apparent from the detailed description below, the invention is shown in the drawing in which:

Fig. 1 shows in perspective view diagrammatically a construction for stereoscopic front projection.

Fig. 2 is a similar view of a modified construction.

Fig. 3 is a similar view of still another modified construction, and

Fig. 4 is a perspective view illustrating diagrammatically a construction for use with stereoscopic rear projection.

In the drawing similar reference characters refer to like parts in the various views.

In order that the present invention may be fully understood, a brief résumé of the prior art is first given. When vertical alternating strips of a picture taken from the position of the right eye and taken from the position of the left eye are juxtaposed upon a plane or screen and this composite picture is viewed through a grating consisting of vertical lines in such a way that the right eye of the observer can only see the strips constituting the right-hand picture and the left eye only the strips of the left-hand picture, then a stereoscopic effect is obtained. If used with stills generally a glass sheet is utilized on which the strips of the left-hand and the right-hand picture are fixed in a layer of a photographic diapositive emulsion.

In order to increase the observation range of the stereoscopic effect, instead of using two sets of stereoscopically corresponding strips there may be used a plurality of groups of picture strips wherein each group consists of as many strips as there were picture taking points. Also the two sets of strips or the plurality of sets of strips may be separated by pictureless separating lines, in order to eliminate the perception of so-called pseudo-stereoscopic and "double" pictures.

In constructions used heretofore, a grating is located in front of the above-mentioned photographic diapositive and this grating generally consists of a glass sheet on which the opaque bars constituting the grating are photographically fixed. Such a grating sheet must be fixed for front projection and observation, parallel to and in front of the picture screen, usually by means of a frame. Therefore, for front projection, cinematographic projection and observation, the apparatus comprises a reflecting glass or metal projection screen with an observation grating located in front of it and both of these elements are maintained in parallel position by means of a frame. In such a construction the granting functions both as the projecting medium for the projection of the stereoscopic portion or strip pictures as well as the selecting medium for the stereoscopic perception of such pictures. When a rear projection apparatus is used such a construction consists of a semi-transparent or translucent screen which is generally made of glass with a projection grating located on one side thereof and an observation grating on the other side of the screen so that there are three separate sheets which are all mounted together by means of a frame.

It is, of course, obvious that in order to secure a correct and undisturbed stereoscopic effect with such elements, it is exceedingly important to have their relative positions fixed with the utmost accuracy.

The disadvantages of the above-mentioned constructions are that quantity production is handicapped by the fact that too much attention must be paid to every screen separately in order to secure a satisfactory result. Furthermore, the slightest inaccuracy with regard to the mutual position of the parts causes the immediate loss of the stereoscopic effect.

If, for example, the distance between the screen and the grating sheet shows any variation at different points then the stereoscopically observed picture is distorted by irregular lines and spots. When the head of the observer is slightly displaced such spots become predominant throughout the entire stereoscopic picture. Therefore, the observer is not permitted to move his head even slightly and in addition the depth of the observation field is considerably limited.

If, in the case of rear projection, the bars of the observation grating are not exactly parallel then the effect results that the right-hand and the left-hand portion pictures are not simultaneously visible throughout the entire surface of the screen. This permits only a partial stereoscopic effect picture while the remainder of the picture will show the psuedo-stereoscopic spots or the irregular black spots if the portion picture strips are divided into groups by black separating lines. If the grating sheet is photographically made, then the gelatine or the collodion layer of the photographic emulsion will remain between the bars of the grating. This will cause the rays coming from the projector to be dispersed during passage through the grating slits. Ultimately this will result in the fact that when the observer moves his head in a horizontal direction with respect to the apparatus, the stereoscopically perceived picture is not differentiated sharply enough from the psuedo-stereoscopic picture or from the darkened plane if the groups of picture strips are separated by black lines. This diffusion of the light between the grating bars creates the effect of "double" pictures as well, while at the same time the observation field is diminished. Besides this, the photographic process for the manufacturing of gratings can easily create other drawbacks as for instance, the bars are not completely opaque or are, in the case of front projection, not sufficiently dull black or the contours of the bars are not sharply delineated, which interferes with the stereoscopic effect.

The present invention is designed to eliminate the above disadvantages and comprises a construction wherein the space intervening between the grating and the screen is filled with the same material as the material upon which the screen and grating is provided. In the case of stills, the front side of a transparent sheet, which may be of glass, has a grating directly fixed thereon either photographically or by any other chemical or mechanical method. On the other side of such sheet of glass the photographic picture which may consist of groups or sets of picture strips, with or without separating lines, is directly fixed by means of a photographic emulsion.

Also, in accordance with the invention, the photographic picture which may be preliminarily attached on paper or Celluloid or similar material, is cemented on the back of the glass sheet. The glass sheet or the sheet of similar material therefore serves as a support for both the grating and the screen.

With respect to a stereoscopic cinematographic projection where the grating is at the same time a selecting medium for the projection and the observation and where the screen must be diffusedly reflecting, such a screen may, in accordance with the invention, be attached directly onto the back side of a sheet of glass. Such back side may first be made dull and then covered with a thin coat of a material such as aluminum lacquer. On the front side of the sheet of glass the grating may be fixed by any photographic, chemical or mechanical means.

Glass is substantially heavy and brittle and in order to overcome these disadvantages of extreme fragility and great weight some other transparent material, as for example Celluloid or some artifically produced solid such as phenol, urea, casein, cellulose acetate, etc. may be used. Materials of this type have sufficient rigidity to assure that the distance between the screen side and the grating side remains fixed and accurate.

Furthermore, in order to avoid any distortion such as may be caused by atmospheric influences and changes, braces or reinforcements may be fixed along the sides of the sheet in order to increase the rigidity of the entire assembly.

The use of an artificial solid offers the advantage that the bars constituting the grating may be molded or formed at the same time as the entire sheet is formed.

In the case of rear projection wherein a translucent screen is mounted between two gratings there may be used two transparent sheets in which the grating bars are disposed on one side of each sheet. Then these two sheets are cemented together with the grating bars on the outside of the assembly by means of a semi-transparent cement layer which will serve as the desired projection screen. In this case also in place of glass various artificial solids may be used upon which the grating bars may be stamped or molded in the material itself and wherein a mat plane is positioned between the two separate sheets.

Instead of using opaque grating bars there may be substituted ribs and such ribs have side surfaces which extend at angles to the surface of the projection screen. Such ribs will act as a selecting medium for selecting the picture strips designed for the left eye and the right eye.

These same results may also be secured by providing a grating in which there are provided vertical parallel ribs of which the cross-sections are segments of circles having an arc of less than 180°.

In Fig. 1 of the drawing the material 1 is transparent and upon such material at one side there is provided the grating 2 which consists of the opaque bars 3 and the transparent slits 4. The opaque bars may be positioned on the glass sheet 1 in any desired manner and on the other side of the sheet the screen 5 is positioned which is a diffusely reflecting screen and such screen may be formed by means of white paint, aluminum paint, aluminum lacquer, etc.

Reinforcing elements 6 are provided extending vertically along each edge of the sheet 1 against the screen portion 5 of the sheet. Ordinarily the glass material or the other material which is used will be sufficient to support the grating and the screen in proper fixed relationship without any possibility of changes taking place due to atmospheric influences or changes.

In Fig. 2 a modified construction is shown in which the sheet of glass is shown at 7 having on one side thereof a screen 8 made as above described with reference to screen 5 and on the other side vertical parallel ribs 9. The ribs 9 in this case will serve as the selecting material in the same way as the alternate opaque bars and slits 3 and 4 of the modification shown in Fig. 1.

A still further modification is shown in Fig. 3 in which the glass sheet is shown at 10 having on one side thereof a diffusely reflecting screen 11 similar to the screens 8 and 5 above described and on the other side ribs 12 having cross-sections which constitute isosceles triangles so that the sides 13 and 14 thereof extend at different angles with respect to the plane of the screen 11. In this case the angularly disposed surfaces 13 and 14 of the ribs 12 serve as a selecting medium for the right and left-hand pictures.

With respect to the modifications shown in Figs. 1, 2 and 3, these modifications are all designed for front projection wherein the grating 2 or the ribs 9 and 12 serve both as a projection grating and also as a selecting medium for the observation of the picture on the screen.

The modification shown in Fig. 4 is designed for rear projection and therefore in this case two gratings are necessary. The projection grating is shown at 15 while the observation grating is shown at 16. The projection grating 15 is provided on one side of a sheet of glass 17 while the observation grating 16 is provided on one side of a glass sheet 18.

The translucent projection screen is shown at 19 and is located between the two sheets of glass 17 and 18. As indicated above, the translucent screen 19 may be formed by a translucent or semi-transparent cement layer which cements sheet 17 to sheet 18.

It is obvious that in all the modifications the correct relationship is maintained at all times between the grating, be it either the projection grating or the observation grating, and the screen thereby eliminating the serious disadvantages present in the construction wherein the screen and the grating are fixed in position by means of a frame.

It is obvious that various modifications may be made in the invention above set forth, but it is desired to cover all modifications which will fall within the spirit of the following claims.

I claim:

1. A grating and screen structure for stereoscopic-effect pictures comprising a body of transparent solid material, a grating on one surface of said body, a second body of transparent solid material, a grating on one surface of said second body, and said bodies of transparent solid material being cemented together at the surfaces opposite the gratings, with semi-transparent cement forming a single translucent screen in the structure.

2. A device for the observation of projected stereoscopic cinematographic pictures, which device is particularly designed for rear projection and comprises a single semi-transparent projection plane, selecting gratings located parallel to said plane both in front thereof and in the back thereof, said gratings being fixed on sheets of transparent material and said sheets being cemented together by a semi-transparent cement forming said semi-transparent projection plane.

ANNA J. M. KLINKUM.